Patented May 1, 1945

2,375,036

UNITED STATES PATENT OFFICE

2,375,036

EXTRACTIVE DISTILLATION

Gino J. Pierotti, Albany, and Clarence L. Dunn, Berkeley, Calif., assignors to Shell Development Company, San Francisco, Calif., a corporation of Delaware No Drawing. Application September 8, 1942, Serial No. 457,680

10 Claims. (Cl. 202—40)

The present invention relates to a distillation process. More particularly, it relates to a process wherein hydrocarbon mixtures containing diolefins are distilled in the presence of relatively high-boiling selective solvents.

Heretofore many processes have been proposed for the separation of hydrocarbon mixtures by distillation in the presence of relatively high-boiling selective solvents, which processes are generally termed "extractive distillation." In such processes the solvent is utilized to alter the normal vapor pressure relationships existing, in such a manner that some of the hydrocarbons whose vapor pressures are relatively increased by the solvent are taken overhead, while those hydrocarbons whose vapor pressures are relatively reduced by the solvent are withdrawn as a bottom product dissolved in the solvent. In ordinary commercial installations these distillations are carried out continuously and the bottom product is redistilled or otherwise treated in a separate step to separate solvent from the bottom hydrocarbon product. The separated solvent is then recycled to the distillation step to exert its vapor pressure-altering effect upon further quantities of hydrocarbons to be distilled.

In processes of tihs type many different relatively high-boiling selective solvents are employed, various phenols, such as phenol and/or alkyl phenols, being particularly suitable. These solvents are frequently employed for the separation of various hydrocarbon mixtures of different degrees of saturation; for example, they are especially suitable for the separation of relatively pure aromatic hydrocarbons, e. g., benzene, toluene, the xylenes, etc., from very narrow boiling petroleum distillates by the process described in U. S. Patent No. 2,288,126. However, they are also applicable to at least a partial separation of hydrocarbon mixtures containing olefins and other hydrocarbons of different solubilities in phenols.

The improvement of this invention is applicable to the extractive distillation with phenol solvents for the separation or concentration of aromatics, mono olefins, naphthenes, paraffins, etc., as the case may be, from hydrocarbon mixtures containing appreciable amounts of diolefins. Such mixtures may occur in various hydrocarbon or coal tar products, especially those derived in the vapor phase cracking, reforming, isomerization, hydroforming of hydrocarbon oils, etc.

It has been found that phenolic solvents are unsuited for the treatment of hydrocarbon fractions in the manner described above, whenever substantial amounts of diolefin hydrocarbons are present in the material so treated. Apparently diolefins react with phenols under the conditions of distillation, yielding high-boiling products which result in solvent losses and also the introduction of the reaction products thus formed into the distillation system. Although the extent of these reactions is ordinarily slight at any one moment, nonetheless the continual recirculation of the solvent to the system tends to build up harmful excesses of reaction products, as well as cause unduly high solvent losses which prevent, in many cases, the operation of such distillation systems at maximum efficiency, requiring at the same time frequent shutdowns for cleaning and removal of reaction products, as well as solvent renewal.

In view of the otherwise eminently suitable properties of such phenolic solvents for the separation of hydrocarbon mixtures of different degrees of saturation, as well as their high selectivity and otherwise general stability for use in such processes wherein solvent is recycled, it is desirable to find some manner of reducing this tendency of these solvents to react with diolefins in order that these solvents may be employed under circumstances when, for example, pretreatment of the mixture to remove or alter the character of the diolefins is not desired.

It is an object of the present invention to provide a means for reducing the tendency of diolefins to react with phenolic solvents under conditions of extractive distillation. Further objects will be apparent from the following:

The present invention comprises distilling hydrocarbon mixtures containing diolefins in the presence of a phenolic solvent containing dissolved an minor amount of an aliphatic or cycloaliphatic amine. Suitable amounts are of the order of 20% or less and preferably about 1% to 10%. It has been found that the presence of the aliphatic amine in the solvent materially reduces the tendency of diolefins to react with phenolic solvents, and as a result, the solvent retains a light color upon continuous recirculation in the extractive distillation process. Ordinarily, phenolic solvents turn dark quite rapidly when used in the distillation of hydrocarbons.

Suitable amines must be stable at the temperature of distillation and be solube in the phenolic solvent. Their boiling temperatures must be on the one hand high enough so that the amines remain dissolved when distilling the hydrocarbons, and, on the other hand, should be sufficiently low so that they can be distilled together with the phenolic solvent, should it become necessary to purify the latter by distillation from accumulated sludge. It is desirable that the amine boil at least about 20° C. higher than the vaporized portion of the hydrocarbon mixture, and preferably 60° C. or higher.

Primary amines are preferred. They may contain one or several additional polar radicals which are preferably neutral or basic, provided they do not cause instability of the amine under the conditions of the distillation, both alone and in the presence of the solvent. Suitable additional radicals are, for example, —OH, O—O, —S—, —NH₂, =NH, ≡N, etc.

Examples of amines useful for our purpose are amylamines, hexylamines, cyclohexylamine, heptyl, octyl, etc., amines, higher aliphatic amines such as may be obtained by conversion of fatty acids to the corresponding amines, piperidine, alkyl piperidines; various polyamines, as ethylene, propylene, butylene, etc., diamines; diethylene diamine, diethylene triamine, triethylene tetramine, tetraethylene pentamine; alkanolamines as mono-, di- or tri-ethanolamines, diamino propanols or butanols or pentanols, etc.; amino diols as amino propane diol, amino butane diol; amino ethers or corresponding thio ethers as beta amino diethyl ether, beta or gamma amino dipropyl or isopropyl ethers, beta-beta' diamino diethyl ether, beta amino beta' hydroxy diethyl ether, beta-beta' or gamma-gamma' diamino diisopropyl ethers; guanidine, substituted guanidine, such as diphenyl guanidine; amino phenyl ethane, etc.

If desired, a small amount of an alkali metal hydroxide or phenolate may be dissolved in the phenol, as described in the copending application Serial No. 449,173, filed June 30, 1942, in addition to the amine. The amount should be such that the dissolved phenolate is preferably less than 5% of the solvent.

While not all of the above-cited amines can be used for the extractive distillation of all hydrocarbon mixtures because of the boiling point requirements stated above, the proper choice of an amine having the required boiling temperature can easily be made with the aid of a chemical handbook.

While it has been found that the addition of aliphatic amines consistently reduces the sludging tendency of phenolic solvents with diolefins by significant amounts, the degree of this reduction depends in some measure upon the diolefin concentration of the mixture being distilled. In general, it may be said that other things being equal, the lower the initial concentration of the diolefins the greater the effect of the aliphatic amines when expressing this effect in percent reduction of sludge formation. Hence a pretreatment of the hydrocarbon mixture to reduce the olefin content may be very useful. Such pretreatment may comprise treatment with strong sulfuric acid, phosphoric acid, aluminum chloride or other Friedel-Crafts catalyst, strong aqueous solutions of various salts applied at elevated temperatures, such as halides, sulfates, nitrates, etc., of Zn, Cu, Cd, Hg, Fe, etc., or clay at elevated temperatures, etc.

Specific phenolic solvents which may be employed are, for example, phenol, cresylic acids, xylenols, trimethyl phenols, ethyl phenol, and alkyl phenol mixtures of indefinite composition, preferably having on the average not more than 2 to 3 carbon atoms in the alkyl radicals. Suitable alkyl phenol mixtures which may be extracted from petroleum or coal tar distillates are preferably employed in the form of relatively narrow-boiling mixtures.

*Example I*

In a distillation set up for producing pure toluene wherein an untreated reformed gasoline distillate boiling from 100°–115° C. and having a maleic anhydride value of 25.4 was distilled in the presence of phenol under conditions to dissolve the toluene and to produce a toluene solution which was withdrawn and redistilled to separate the toluene from the phenol. The phenol was then continuously recirculated to the distillation zone to contact further quantities of the reformed gasoline. It was found that the rate of sludge formation was 6.0%/day. After the addition of 2% ethanolamine to the phenol, the sludge formation dropped to 3.2%/day; and the presence of 18% triethanolamine reduced it to .9%/day.

*Example II*

A mixture of 18% ethanolamine and .5% potassium hydroxide in phenol reduced the sludging tendency of the phenol under otherwise unchanged conditions from 6.0%/day to 0.1%/day.

We claim as our invention:

1. In the extractive distillation of hydrocarbon mixtures containing diolefins with a phenolic solvent, the improvement comprising distilling said mixture in the presence of said solvent containing dissolved a minor amount of an aliphatic amine which is stable under the conditions of the distillation and has a boiling temperature substantially higher than that of said hydrocarbon mixture.

2. The process of claim 1 wherein said solvent is phenol.

3. The process of claim 1 wherein said solvent is an alkyl phenol in which the total number of carbon atoms in the alkyl radicals is 3 or less.

4. The process of claim 1 wherein said minor amount is less than 20%.

5. The process of claim 1 wherein said minor amount is between 1% and 10%.

6. The process of claim 1 wherein said amine contains an additional polar radical selected from the group consisting of —OH, —O—, —S—, —NH₂, =NH and ≡N.

7. The process of claim 1 in which said aliphatic amine is cycloaliphatic.

8. In the extractive distillation of a hydrocarbon mixture containing diolefins with a phenolic solvent, the steps comprising distilling said mixture in a distillation zone in the presence of said solvent containing dissolved a minor amount of an aliphatic amine which is stable under the conditions of said distillation and has a boiling temperature substantially higher than that of said mixture, to produce a phenolic solution containing dissolved a portion of said hydrocarbon mixture, withdrawing said solution from said distillation zone, separately distilling the withdrawn solution to recover said solvent containing said amine and returning it to said distillation zone.

9. In the extractive distillation of a hydrocarbon mixture containing diolefins with phenolic solvent, the improvement comprising treating said mixture to remove a portion of said diolefins and thereafter distilling the treated mixture with said solvent containing dissolved a minor amount of an aliphatic amine which is stable under the conditions of said distillation and has a boiling temperature substantially higher than that of said mixture.

10. The process of claim 1 wherein said solvent contains less than 5% of a dissolved phenolate.

GINO J. PIEROTTI.
CLARENCE L. DUNN.